(No Model.) 2 Sheets—Sheet 1.

M. DALLAS.
CONDUIT FOR ELECTRIC RAILWAYS.

No. 393,622. Patented Nov. 27, 1888.

Witnesses:

Inventor:
M. Dallas.
By W. R. Stringfellow
Attorney.

(No Model.)  2 Sheets—Sheet 2.

M. DALLAS.
CONDUIT FOR ELECTRIC RAILWAYS.

No. 393,622.  Patented Nov. 27, 1888.

Witnesses:

Inventor:
M. Dallas.
By W. R. Stringfellow,
Attorney.

UNITED STATES PATENT OFFICE.

MADISON DALLAS, OF NEW ORLEANS, LOUISIANA.

CONDUIT FOR ELECTRIC RAILWAYS.

SPECIFICATION forming part of Letters Patent No. 393,622, dated November 27, 1888.

Application filed July 30, 1888. Serial No. 281,418. (No model.)

*To all whom it may concern:*

Be it known that I, MADISON DALLAS, a citizen of the United States, residing at New Orleans, in the parish of Orleans and State of Louisiana, have invented certain new and useful Improvements in a Conduit for Electric Wires for Street-Railways; and I do declare the following to be a full, clear, and exact description of the invention, such as will enable others skilled in the art to which it appertains to make and use the same.

My invention relates to improvements in a conduit for wires for an electric railway in which a sheave is made to operate in conjunction with a wire or rod placed within a conduit; and the object of my invention is to provide a device whereby cars may be propelled by electricity by means of a surface conduit. I attain this object by the mechanism illustrated in the accompanying drawings, in which—

Figure 1:
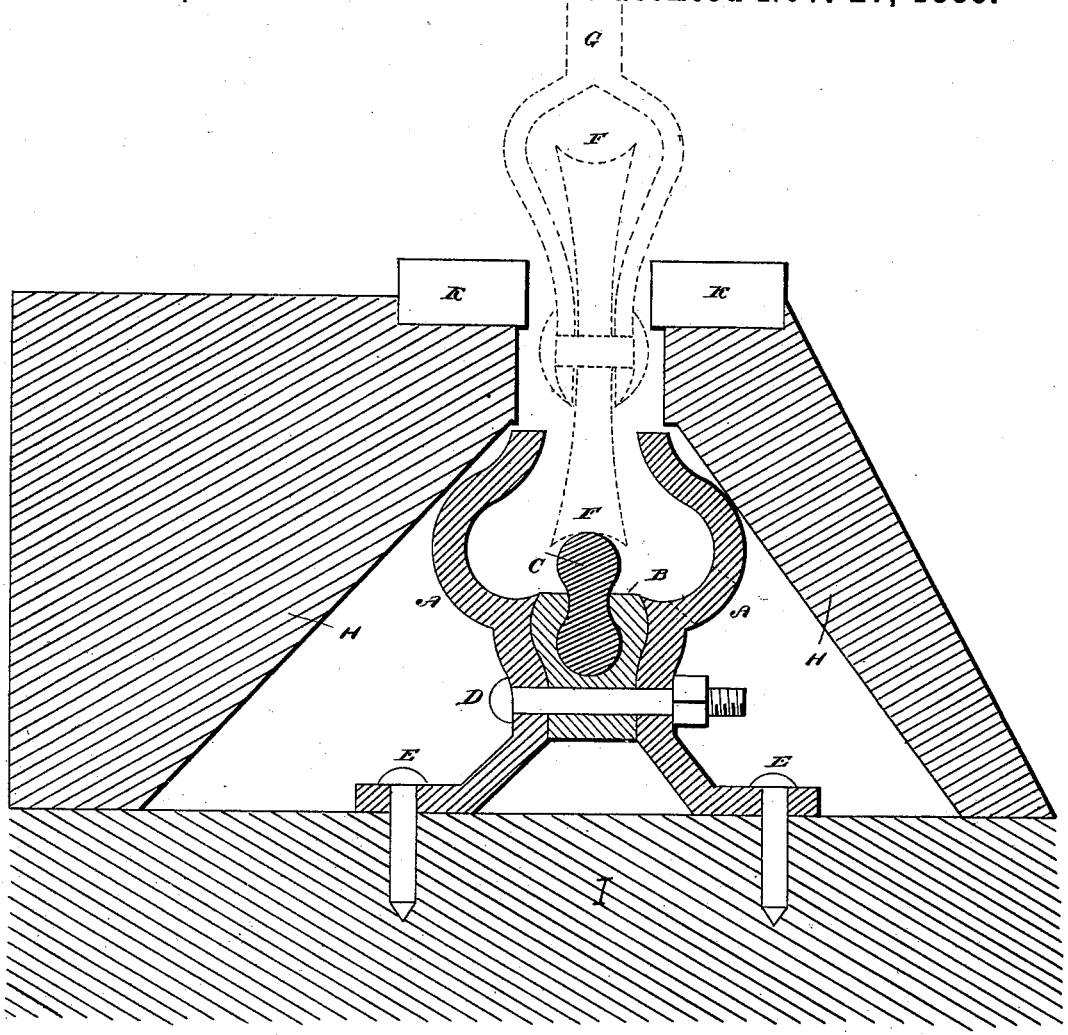
Figure 2:
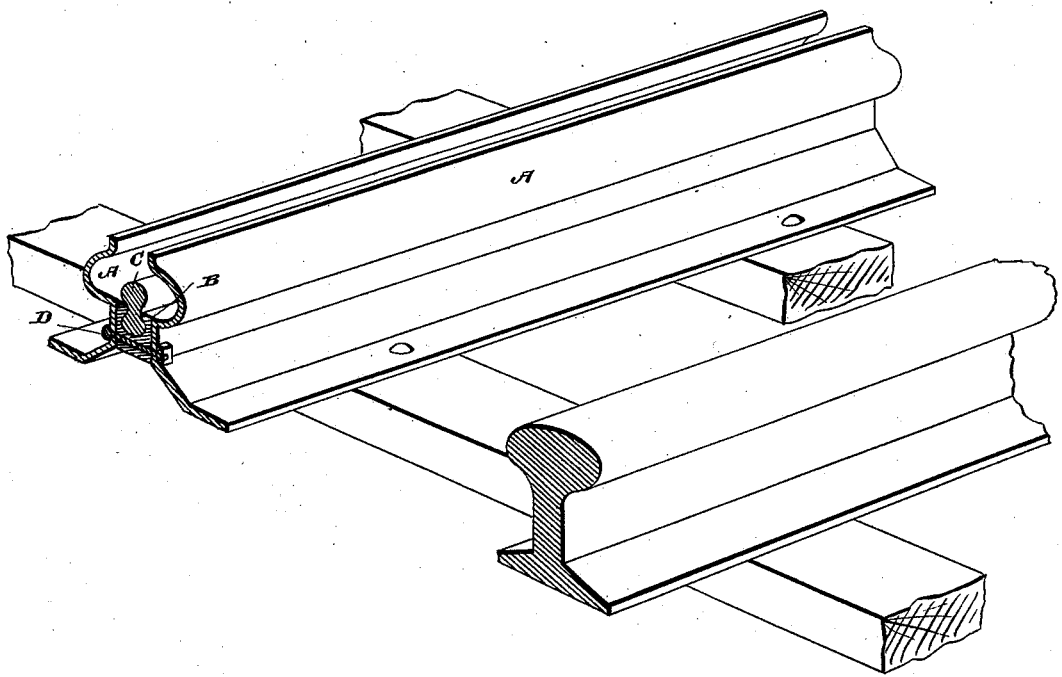

Figure 1 is an end view. Fig. 2 is a perspective view.

Similar letters refer to similar parts throughout the several views.

In constructing my device I take two pieces of wrought-iron, as shown by A, which forms the side of conduit. These pieces are about three-sixteenths of an inch thick and, say, fifteen or twenty feet in length. I also place between side pieces A a wooden strip, as shown by B. This strip is about one quarter of an inch thick and so constructed that the wire or metal rod C rests within same. This wire or rod C may be from a half to one inch in size. I then adjust side pieces A to cross-ties I by bolts E, and by means of bolt D hold side pieces A in position, and when drawn together leave an opening at top of conduit of three-fourths of an inch for sheave F to work in. I also place small openings in each end of side pieces A for water to drain through.

H are wooden pieces of from fifteen to twenty feet in length, which are placed on each side of conduit, and are fastened to cross-ties and shield conduit from vehicles crossing same.

K are metal strips running entire length of wooden pieces H and prevent wear and tear of same.

In practice sheave F, (which is held in position by arm G, attached to bottom of car,) forms a contact with wire or metal rod C, thus enabling the electric current with which C is charged to be utilized. The plant for generating electricity may be situated several miles distant.

A striking advantage of my conduit is that it is unnecessary to make an excavation, as the conduit is placed upon the cross-ties either in the center of track or in close proximity to the rail, thus enabling a railway company to construct a conduit at an expense of not over two thousand five hundred dollars per mile, and avoiding all gas and water pipe connections in the streets of cities.

By the use of my conduit it is possible to propel cars by electricity other than those used on street-railways.

Having described my invention, what I claim, and desire to secure by Letters Patent, is—

In a surface-conduit for electric wires for street or other railways, such as described, the side pieces, A, wooden strip B, metal rod or wire C, in combination with cross-ties I, side pieces, H, and metal strips K, for the purpose set forth.

In testimony whereof I affix my signature in presence of two witnesses.

MADISON DALLAS.

Witnesses:
HENRY J. RHODES,
PERCY D. PARKS.